US009500219B2

(12) United States Patent
Aoshima

(10) Patent No.: US 9,500,219 B2
(45) Date of Patent: Nov. 22, 2016

(54) STUD LOCKING DEVICE

(71) Applicant: NEWFREY LLC, Newark (DE)

(72) Inventor: Yuuki Aoshima, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 14/619,824

(22) Filed: Feb. 11, 2015

(65) Prior Publication Data
US 2015/0152910 A1 Jun. 4, 2015

Related U.S. Application Data

(63) Continuation of application No. PCT/JP2013/071691, filed on Aug. 9, 2013.

(30) Foreign Application Priority Data

Aug. 15, 2012 (JP) .................................. 2012-180019

(51) Int. Cl.
*F16B 37/08* (2006.01)
*F16B 39/28* (2006.01)
*B60R 13/02* (2006.01)

(52) U.S. Cl.
CPC ........... *F16B 39/28* (2013.01); *B60R 13/0206* (2013.01); *F16B 37/0842* (2013.01); *F16B 37/0857* (2013.01)

(58) Field of Classification Search
CPC ..... F16B 37/08; F16B 37/0857; F16B 39/28
USPC .............................. 411/41–48, 433, 508–509
See application file for complete search history.

(56) References Cited

U.S. PATENT DOCUMENTS

| 4,435,111 A | * | 3/1984 | Mizusawa | ........... F16B 37/0842 411/21 |
| 4,850,778 A | * | 7/1989 | Clough | ............... F16B 37/0842 411/182 |
| 5,302,070 A | * | 4/1994 | Kameyama | ......... F16B 37/0842 411/437 |

(Continued)

FOREIGN PATENT DOCUMENTS

| CN | 101561009 B | 4/2013 |
| EP | 0741251 A | 11/1996 |

(Continued)

OTHER PUBLICATIONS

EP Search Report Dated Mar. 1, 2016.

*Primary Examiner* — Roberta Delisle
(74) *Attorney, Agent, or Firm* — Michael P. Leary

(57) ABSTRACT

A stud locking device, which in an assembled condition can hold a target member to a support member, the target member defining a through hole, and the support member including an axially projecting stud; the stud locking device comprising: a first clip including an inner cylindrical portion with a first flange at a target end and defining a central bore for receiving the stud, and insertable at a base end through the mounting hole; and a second clip including: a outer cylindrical portion capable of receiving coaxially the first cylindrical portion; and a second flange provided at a target end of the outer cylindrical portion; and wherein a tapered bore is defined by and coaxial with the first flange and first cylindrical portion, the tapered bore open in the upper surface of the flange, narrowing with increasing axial distance from the open end, and connected to the central bore.

6 Claims, 12 Drawing Sheets

(56) References Cited

U.S. PATENT DOCUMENTS

| | | | |
|---|---|---|---|
| 5,460,342 A | 10/1995 | Dore et al. | |
| 5,660,513 A * | 8/1997 | Shibanushi | F16B 37/0842 411/433 |
| 6,598,836 B1 * | 7/2003 | Leon | F16B 37/0842 248/74.1 |
| 7,322,784 B2 * | 1/2008 | Castro | F16B 37/0842 411/433 |
| 7,891,151 B2 * | 2/2011 | Sano | B62D 25/2072 296/97.23 |
| 8,007,029 B2 | 8/2011 | Sano | |
| 8,684,321 B2 | 4/2014 | Shirakabe et al. | |
| 8,753,055 B2 | 6/2014 | Ruckel | |
| 2006/0099049 A1 * | 5/2006 | Peterson | F16B 39/32 411/433 |
| 2007/0248436 A1 * | 10/2007 | Sano | B62D 25/2072 411/175 |
| 2008/0181748 A1 * | 7/2008 | Rosemann | F16B 37/0857 411/431 |

FOREIGN PATENT DOCUMENTS

| | | |
|---|---|---|
| EP | 2131084 A | 9/2009 |
| JP | 7-174127 A | 7/1995 |
| JP | 4005190 B | 11/2007 |
| JP | 2009162358 A | 7/2009 |

* cited by examiner

STUD LOCKING DEVICE

CROSS-REFERENCE TO RELATED APPLICATIONS

This application is a continuation of PCT/JP2013/71691, filed on Aug. 9, 2013, which claims priority from Japanese Patent Application No. 2012-180019, filed on Aug. 15, 2012, the disclosure of which is incorporated herein by reference.

BACKGROUND OF THE INVENTION

The present invention relates to a locking device usable for mounting a sheet-shaped target member (e.g., an undercover) to a support member (e.g., a panel of an automotive vehicle) having a stud (e.g., a threaded stud) fixed thereto. More specifically, it relates to a stud locking device usable for mounting the target member to the support member, in such a manner that it is lockedly engaged with the stud while retaining the target member.

Generally, a locking device is employed as a means to mount a sheet-shaped target member such as an undercover to a support member such as a panel of an automotive vehicle. In advance of an operation of mounting a wide sheet-shaped target member such as an undercover to a panel, a plurality of threaded studs are fixedly attached onto the panel at respective given positions thereof by welding or the like, and a plurality of mounting holes for receiving therein the respective studs are formed in the undercover at respective given positions thereof. Then, the target member is put to the panel and positioned to allow the studs to be inserted into corresponding ones of the mounting holes of the target member, and a plurality of nuts are engaged, respectively, with portions of the studs protruding from the target member by using a tool. In this manner, the target member is mounted to a support member such as a panel of an automotive vehicle.

There has been known a stud locking device designed to facilitate such a target member mounting operation and configured to clamp a target member from both sides thereof by a first clip and a second clip, and, in this state, receive a stud into a stud-receiving hole of the locking device to thereby mount the target member to the stud.

Published Japanese application JP2007/292146 A and its US counterpart application US2007/0248436 A discloses this type of locking device (stud locking device) comprising a first clip and a second clip. The first clip comprises an inner cylindrical portion, a flange configured to come into contact with one of opposite surfaces of the target member, and locking pawls formed inside the inner cylindrical portion, and the second clip comprises an outer cylindrical portion; and a flange configured to come into contact with the other surface of the target member. The locking device disclosed in US2007/0248436 A is configured to be lockedly engaged with each of a plurality of studs fixedly attached to a support member such as a panel of an automotive vehicle, while clamping a sheet-shaped target member by the first clip and the second clip, thereby mounting the target member to the support member.

FIG. 1 illustrates the locking device 1' disclosed in US2007/0248436 A. The locking device 1' comprises a first clip 2 made of a hard synthetic resin (and molded as a single piece), and a second clip 3 made of a hard synthetic resin and molded as a single piece. The first clip 2 has an inner cylindrical portion 2b, and a flange 2a formed at one end of the inner cylindrical portion 2b. The second clip 3 has an outer cylindrical portion 3b, and a flange 3a formed at one end of the outer cylindrical portion 3b. The inner cylindrical portion 2b of the first clip 2 is inserted into a mounting hole 9 of a sheet-shaped target member 5 to be mounted, and further inserted into the outer cylindrical portion 3b of the second clip 3. Thus, the first clip 2 and the second clip 3 are couple together while clamping the target member 5 therebetween. When a stud 7 fixedly attached onto a support member 6 such as a panel of an automotive vehicle is inserted into a stud-receiving hole of the locking device 1', a locking pawl 4 of the first clip 2 is lockedly engaged with a thread ridge of the stud 7, so that the target member 5 is mounted to the support member 6. A hexagonal hole 8 is formed in a central region of the flange of the first clip 2. Thus, a hexagonal wrench can be engaged with the hexagonal hole 8 and rotated to further tighten up or detach the locking device 1' with respect to the stud 7.

In the locking device disclosed in US2007/0248436 A, the hexagonal hole is formed in a central portion of the first clip 2 to allow the hexagonal wrench to be rotated while being inserted therein. The hexagonal hole has a relatively small diameter and a relatively long length so as to ensure engagement with the hexagonal wrench, and thus it is difficult to visually ascertain how much the first clip is inserted with respect to the stud, even when viewed from above the hexagonal hole. If the first clip is not fully inserted, a pull-out load is likely to decrease. Moreover, in the locking device disclosed in US2007/0248436 A, a bottom of the first clip does not have a taper wall for allowing the stud to be received in the stud-receiving hole. Thus, when the stud is inserted into the stud-receiving hole, it is likely that there is difficulty in guiding and inserting the stud with respect to the stud-receiving hole.

Published Japanese application JP2009/162358 A discloses a stud bolt clip lockable to a stud bolt provided to stand on a vehicle panel of an automotive vehicle, or the like. The stud bolt clip is a single component. The stud bolt clip comprises: a pair of first locking members each formed to extend from a corner of a bolt insertion hole-side end of an inner surface of a respective one of two opposed sidewall portions, in such a manner that they are disposed in opposed relation to each other; and a pair of second locking members each formed to extend from an axially approximately central region of the inner surface of the respective one of the opposed sidewall portions, in such a manner that they are disposed in opposed relation to each other. Each of the first locking members has an inner surface formed with three first locking ribs engageable with thread grooves of a first stud bolt having a relatively small thread pitch, and each of the second locking members has an inner surface formed with three second locking ribs engageable with thread grooves of a second stud bolt having a relatively large thread pitch.

In an operation for locking to the first stud bolt having a relatively small thread pitch, the three first locking ribs are engaged with thread grooves of the first stud bolt, and either one of the three second locking ribs is engaged with a thread groove of the first stud bolt. In an operation for locking to the second stud bolt having a relatively large thread pitch, either one of the three first locking ribs is engaged with a thread groove of the second stud bolt, and the three second locking ribs are engaged with thread grooves of the second stud bolt.

The stud bolt clip disclosed in JP2009/162358 A can be locked to each of two types of stud bolts having different pitches. However, when the stud bolt clip is locked to the first stud bolt, only a part of the three second locking ribs is engaged with a thread groove of the second stud bolt. On the other hand, when the stud bolt clip is locked to the second stud bolt, only a part of the three first locking ribs is engaged with a thread groove of the first stud bolt. Thus, the stud bolt clip is likely to fail to be reliable mounted. Further, in an operation of attaching the stud bolt clip to a target member to be mounted, a pair of clamping ribs are inserted, respectively, into a pair of member through-grooves, and turned 90° to clamp the target member between the clamping ribs and a flange of the stud bolt clip. Thus, it is necessary to form, in the target member, a mounting hole together with the pair of quadrangular-shaped member through-grooves, i.e., take a lot of time and effort for processing of the target member.

Therefore, there is a need for a stud locking device capable of mounting a target member such as an undercover to a support member such as a panel of an automotive vehicle, readily and reliably. There is also a need for a stud locking device capable of readily ascertaining whether a clip is perfectly mounted to a stud.

SUMMARY OF THE INVENTION

It is therefore an object of the present invention to provide a stud locking device capable of mounting a target member such as an undercover to a support member such as a panel of an automotive vehicle, readily and reliably. It is another object of the present invention to provide a stud locking device capable of readily ascertaining whether a clip is perfectly mounted to a stud.

In order to achieve the above objects, according to one aspect of the present invention, there is provided a stud locking device comprising a first clip and a second clip connected to each other while holding a target member from both sides thereof, wherein the stud locking device receives a stud fixed on a support member in a stud receiving space and is latched by the stud, by which the stud locking device is fixed onto the support member and the target member is mounted onto the support member.

wherein the first clip has: a hollow inner cylindrical portion insertable into a mounting hole of the target member; a flange provided at one end of the inner cylindrical portion; locking pawls formed inside the inner cylindrical portion and engageable with thread ridges of the stud; and a coupling means for coupling to the second clip, and the second clip has: a hollow outer cylindrical portion capable of receiving therein the inner cylindrical portion of the first clip; a flange provided at one end of the outer cylindrical portion; and a coupling means for coupling to the first clip, and wherein the first clip has a taper portion tapered from an upper surface of the flange thereof toward the inner cylindrical portion along a central axis thereof, whereby a tip of the stud can be viewed from the upper surface of the flange through the taper portion.

In the stud locking device of the present invention, the target member can be mounted to the support member readily and reliably through an operation of clamping the target member from both sides thereof by the first clip and the second clip, and engaging the locking pawl of the first clip with a thread ridge of the stud fixed to the support member.

In addition, the tip of the stud can be seen from the upper surface of the flange through the taper portion, so that it becomes possible to readily ascertain whether the clips are perfectly mounted to the stud.

Preferably, when the inner cylindrical portion of the first clip is inserted into the mounting hole of the target member, the flange of the first clip come into contact with one surface of the target member, and, when the inner cylindrical portion of the first clip is received in the outer cylindrical portion of the second clip, the flange of the second clip come into contact with the other surface of the target member. This makes it possible to reliably clamp the target member.

Preferably, the bottom portion of the inner cylindrical portion has a guide wall which has a taper tapered toward the flange of the inner cylindrical portion to guide the tip of the stud to the stud-receiving space. More preferably, the taper angle of the guide wall is in the range of 115 to 135°. This makes it possible to easily guide the tip of the stud to the stud-receiving space.

Preferably, the flange of the second clip has an elastic edge portion capable of elastically pressing the target member toward the flange of the first clip. This makes it possible to clamp the target member so as to avoid wobbling.

More preferably, the flange of the second clip is formed with two flange holes opposite from each other, each of which holes is narrow and long in a circumferential direction, which makes the elastic edge portion in the area adjacent to the flange holes more flexible. This makes it possible to elastically press the target member.

Preferably, the inner cylindrical portion has two pairs of the locking pawls along an axial direction thereof, and a plurality of ribs opposite from one another, each extending along the axial direction, and wherein the stud-receiving space is formed by the locking pawls and the ribs. This makes it possible to position the stud within the stud-receiving space.

Preferably, each of the locking pawls is engageable with two studs having different thread pitches, and has a plurality of first pawl tips insertable into thread grooves of the two studs having different thread pitches and a second pawl tip insertable into a thread groove of one of the two studs. This makes it possible to be reliably engaged with two studs having different thread pitches.

The present invention can provide a stud locking device capable of mounting a target member such as an undercover to a support member such as a panel of an automotive vehicle, readily and reliably. The present invention can also provide a stud locking device capable of readily ascertaining whether a clip is perfectly mounted to a stud.

DESCRIPTION OF THE PREFERRED EMBODIMENTS

With reference to the drawings, the present invention will now be described based on an embodiment thereof. A stud locking device 1 according to a first embodiment of the present invention comprises a first clip 10 illustrated in FIGS. 2 to 11, which is made of a hard synthetic resin and molded as a single piece, and a second clip 30 illustrated in FIGS. 12 to 20, which is made of a hard synthetic resin and molded as a single piece.

Figure 21:
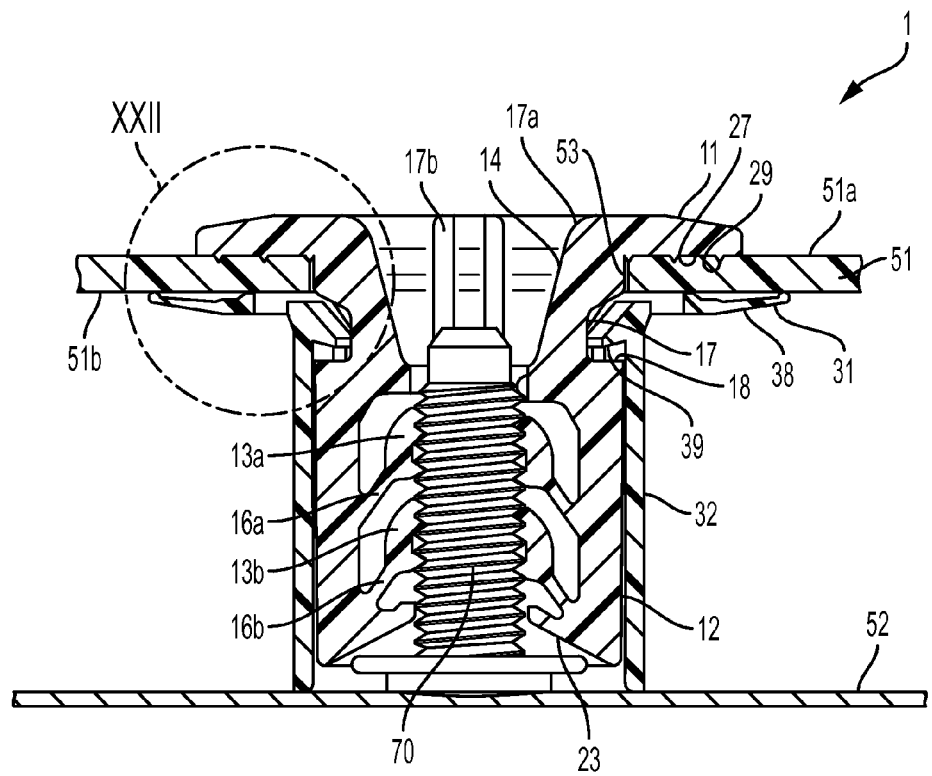
FIG. 21 is a sectional view illustrating a state in which a target member is mounted to a support member with a stud by using the stud locking device according to the first embodiment of the present invention.

Before describing each configuration of the first clip 10 and the second clip 30, an outline of a configuration of the stud locking device 1 will be described. FIG. 21 is a sectional view illustrating a state in which a target member 51 is mounted to a support member 52 with a stud 70 by using the stud locking device 1 according to the first embodiment of the present invention. The first clip 10 and the second clip 30 of the stud locking device 1 are coupled together while clamping a sheet-shaped target member 51 such as an undercover therebetween. When a stud 70 fixed onto a support member 52 such as a panel of an automobile vehicle is inserted into a stud-receiving space 24 of the stud locking device 1, locking pawls 13 are lockedly engaged with a thread ridge of the stud 70, and thus the target member 51 is mounted to the support member 52.

The first clip 10 of the stud locking device 1 has a hollow inner cylindrical portion 12, a flange 11 provided at a first or top end of the inner cylindrical portion 12, and locking pawls 13 formed inside the inner cylindrical portion 12 and engageable with the stud 70. The hollow inner cylindrical portion 12 is insertable into a mounting hole 53 of the target member 51. The flange 11 is configured to, when the inner cylindrical portion 12 is inserted into the mounting hole 53, come into contact with an upper surface 51a of the target member 51.

The second clip 30 of the stud locking device 1 has a hollow outer cylindrical portion 32 capable of receiving therein the inner cylindrical portion 12 of the first clip 10, and a second flange 31 provided at a first or top end of the outer cylindrical portion 32. The second flange 31 is configured to, when the inner cylindrical portion 12 is received in the outer cylindrical portion 32, come into contact with the lower surface 51b of the target member 51. The first clip 10 also has a neck portion 17 provided on the inner cylindrical portion 12 and formed with a locking shoulder 18. The second clip 30 also has a locking section 39 formed inside the outer cylindrical portion 32. The locking shoulder 18 and the locking section 39 serve as a coupling means to mutually couple the first clip 10 and the second clip 30.

A plurality of the studs 70 are fixedly attached onto the support member 52 by welding or the like, at given intervals and in a given layout, to retain a wide sheet-shaped target member such as an undercover at a plurality of positions. In the first embodiment, as the stud 70, a threaded stud having a thread formed on a peripheral surface thereof is employed. Although the stud 70 may be a grooved stud having a peripheral groove formed on a peripheral surface thereof, the threaded stud is preferred from the viewpoint of convenience to detach the target member from the support member.

The sheet-shaped target member 51 such as an undercover is formed with a plurality of the mounting holes 53 at respective positions corresponding to those of the plurality of studs 70 to allow the studs 70 to penetrate therethrough.

Figure 1:
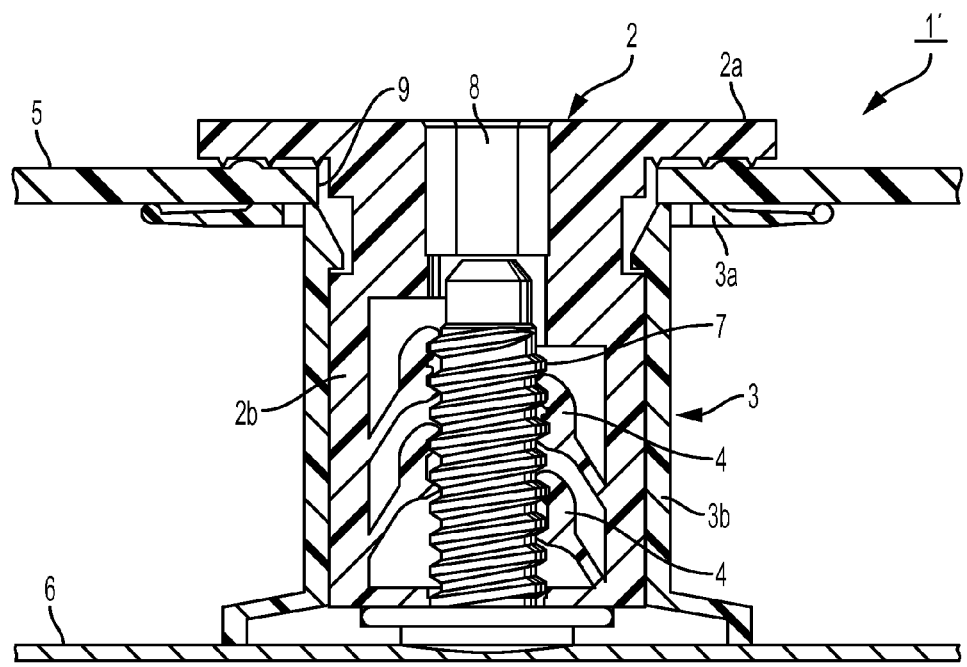
FIG. 1 is a sectional view illustrating a state in which a target member is mounted to a support member with a stud by using a conventional stud locking device.
Figure 2:
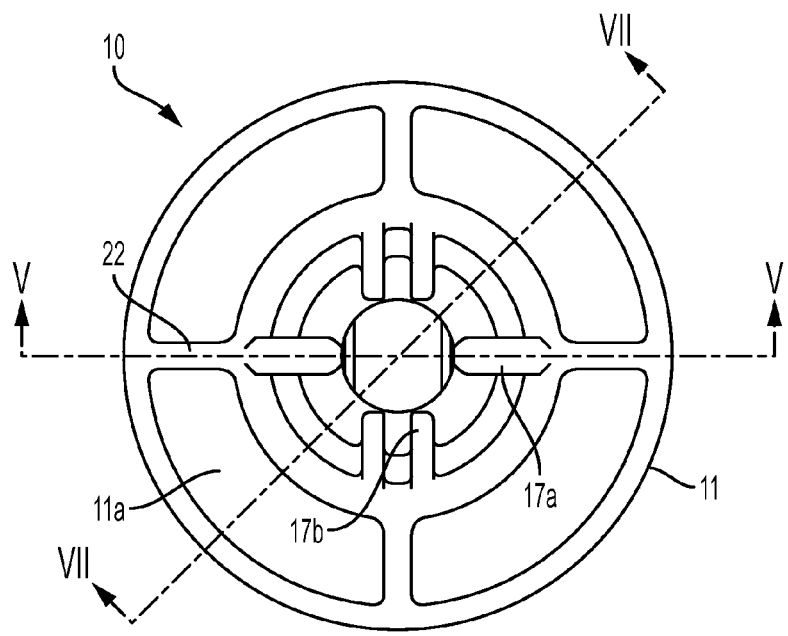
FIG. 2 is a top plan view of a first clip of a stud locking device according to a first embodiment of the present invention.
Figure 3:
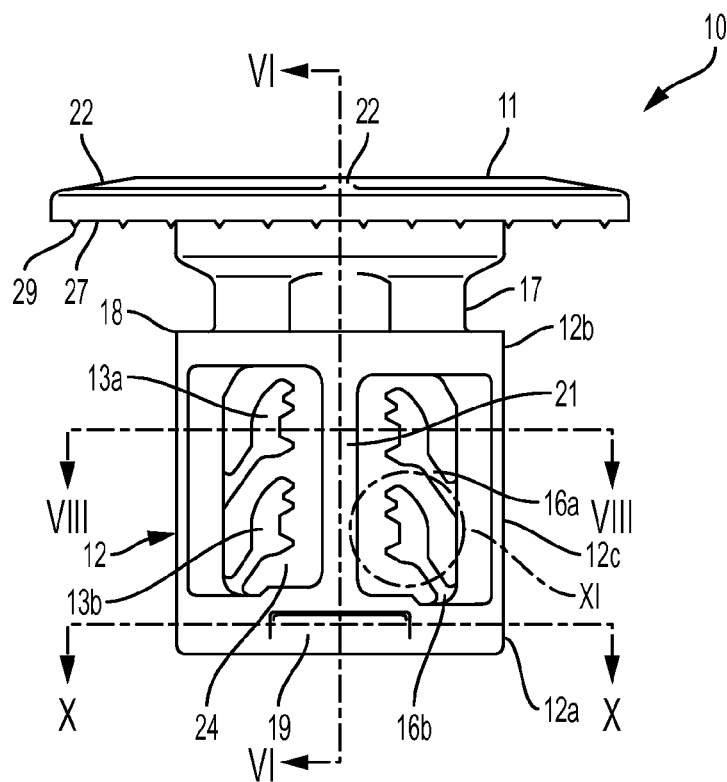
FIG. 3 is a front view of the first clip in FIG. 2.
Figure 4:
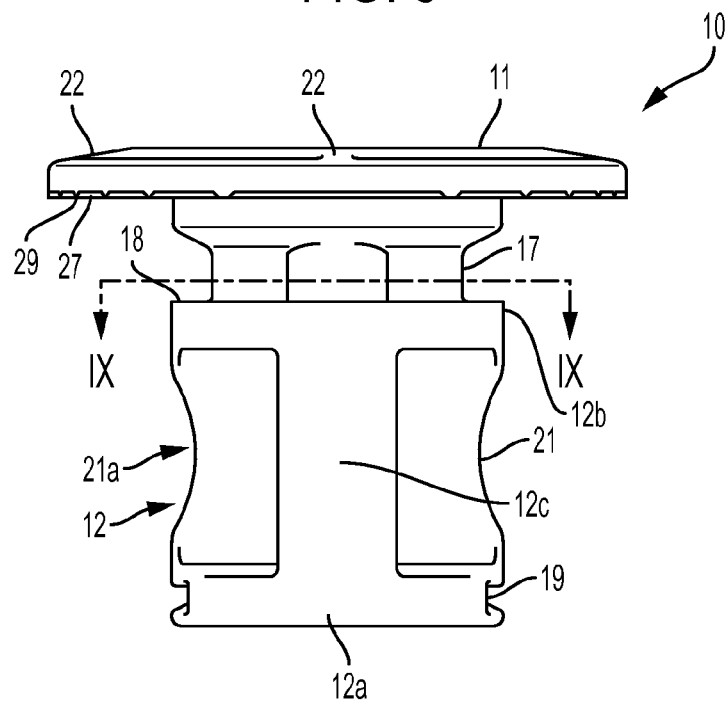
FIG. 4 is a right side view of the first clip in FIG. 2.
Figure 5:
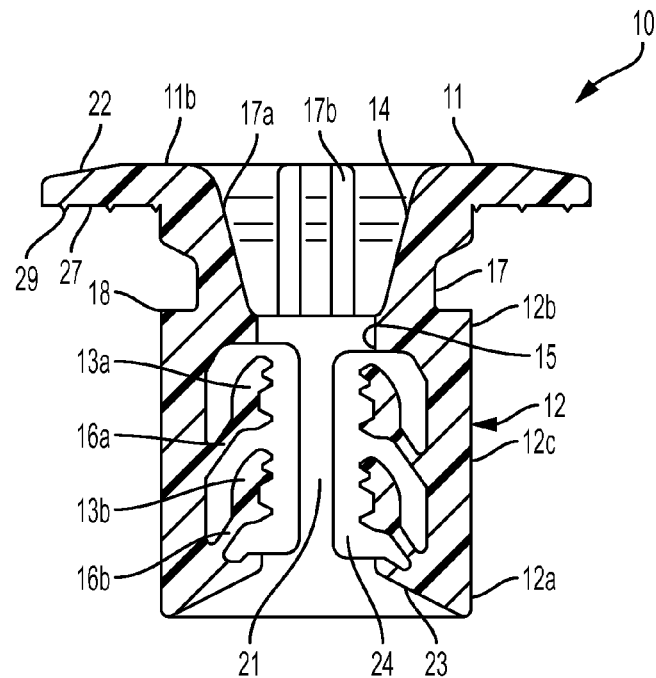
FIG. 5 is a sectional view of the first clip in FIG. 2, taken along the line V-V in FIG. 2.

With reference to FIGS. 2 to 11, the first clip 10 will be described. FIG. 2 is a top plan view of the first clip of the stud locking device according to the first embodiment of the present invention. FIG. 3, FIG. 4 and FIG. 5 are, respectively, a front view of the first clip, a right side view of the first clip, and a sectional view taken along the line V-V in FIG. 2.

As illustrated in FIG. 3, the first clip 10 has the hollow inner cylindrical portion 12, and the flange 11 formed at one end of the inner cylindrical portion 12. The inner cylindrical portion 12 is configured to be inserted into the outer cylindrical portion 32 of the second clip 30. The inner cylindrical portion 12 is formed as a hollow cylindrical body capable of receiving therein the stud 70, wherein a plurality of (in the illustrated embodiment, two) pairs of elastic locking pawls 13a and 13b engageable with the stud 70 are provided inside the inner cylindrical portion 12. The inner cylindrical portion 12 has an inner diameter capable of allowing the stud 70 to be received therein, and an outer diameter capable of allowing the inner cylindrical portion 12 to be inserted into the outer cylindrical portion 32 of the second clip 30. The flange 11 is configured to, when the inner cylindrical portion 12 is inserted into the mounting hole of the target member 51, come into surface contact with the first (upper) surface 51a of the target member 51.

As illustrated in FIGS. 3 and 4, the inner cylindrical portion 12 comprises a ring-shaped base section 12a as a lower section, a ring-shaped top section 12b as an upper section, and a sidewall section 12c extending between the base section 12a and the top section 12b in an axial direction thereof.

Figure 8:
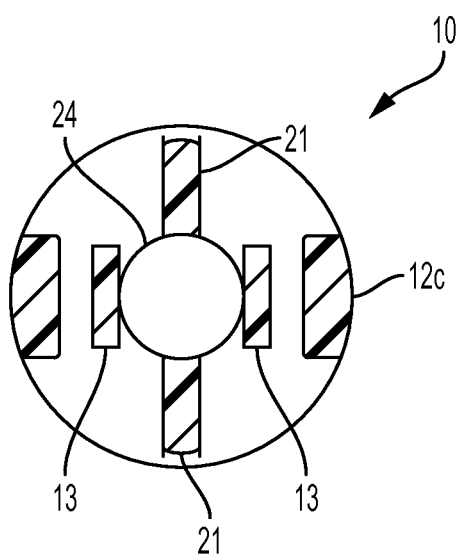
FIG. 8 is a sectional view of the first clip in FIG. 2, taken along the line VIII-VIII in FIG. 3.

Further, a plurality of (in the illustrated embodiment, two) ribs 21 are formed to extend between the base section 12a and the top section 12b in the axial direction. As illustrated in FIG. 8 which is a sectional view taken along the line VIII-VIII in FIG. 3, a distance between the opposed ribs 21 is slightly greater than an outer diameter of the stud 70. The aforementioned stud-receiving space 24 for receiving therein the stud 70 is formed by the ribs 21 and the locking pawls 13, and the received stud 70 is positioned to become coaxial with the first clip 10.

Figure 6:
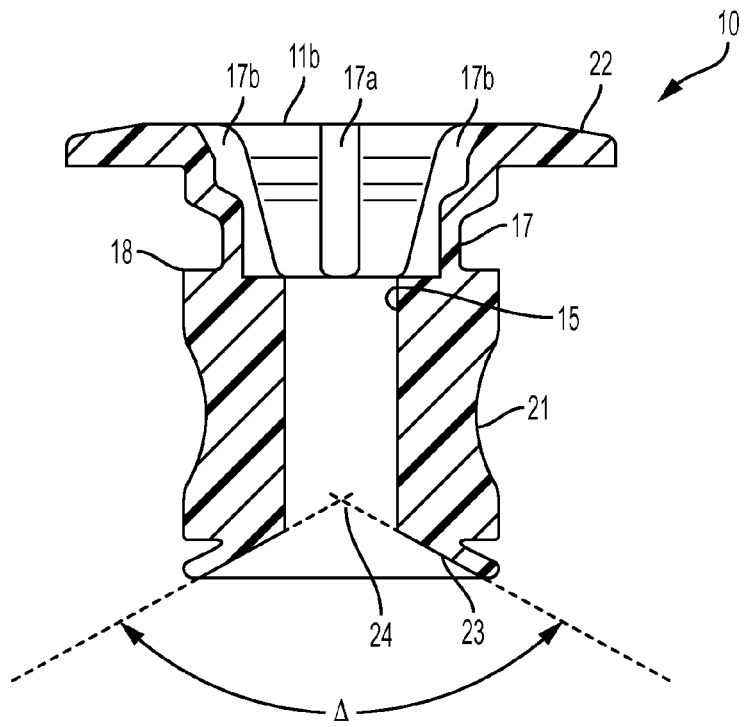
FIG. 6 is a sectional view of the first clip in FIG. 2, taken along the line VI-VI in FIG. 3.

As illustrated in FIG. 6 which is a sectional view taken along the line VI-VI in FIG. 3, an outer surface of each of the rib 21 is formed such that an intermediate region thereof in an up-down direction comes close to the central axis, i.e., in a concave shape 21a.

Figure 10:
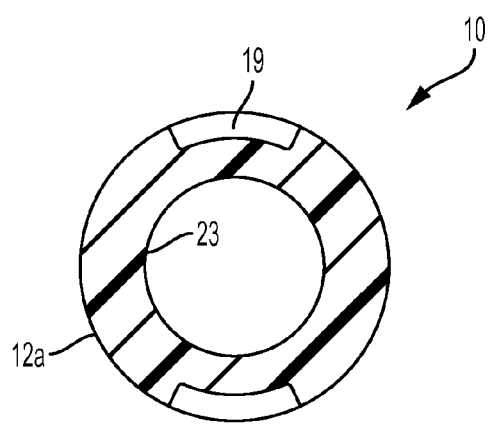
FIG. 10 is a sectional view of the first clip in FIG. 2, taken along the line X-X in FIG. 3.

As illustrated in FIG. 10 which is a sectional view taken along the line X-X in FIG. 3, the base section 12a of the inner cylindrical portion 12 is formed with a recess 19 beneath each of the ribs 21.

A pair of opposed arms 16b are disposed to extend from a base end of the sidewall section 12c obliquely upwardly and inwardly within the stud-receiving space 24. Each of the pair of lower locking pawls 13b is supported by a respective one of the pair of arms 16b. Another pair of opposed arms 16a are disposed to extend from an intermediate region of the sidewall section 12c obliquely upwardly and inwardly within the stud-receiving space 24. Each of the pair of upper locking pawls 13a is supported by a respective one of the pair of arms 16a.

When the stud 70 is inserted into the stud-receiving space 24, the arms 16a, 16b are bent to allow the stud 70 to be received in the stud-receiving space 24. Pawl tips of the locking pawls 13a, 13b enter and come into engagement with respective thread grooves each formed between adjacent thread ridges of the stud 70, to thereby lock the first clip 10 to the stud 70. The arms 16a, 16b are elastically deformable, so that the first clip 10 can be pressed into the stud 70 by a moderate force. Once the locking pawls 13a, 13b come into engagement, they can be strongly locked with less risk of pull-out. The opposed locking pawls 13a (13b) are mutually offset in terms of a height position, in conformity to a thread pitch of the stud 70.

In the present invention, each of the locking pawls 13a, 13b is configured to be engageable with two studs having different thread pitches. Specifically, in this embodiment, it is engageable with a stud bolt M6 having a thread pitch of 1.0 mm and a stud bolt T6 having a thread pitch of 1.6 mm.

Figure 11:
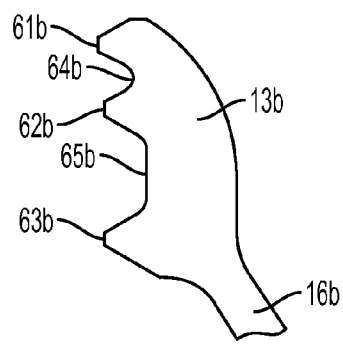
FIG. 11 is an enlarged view of the area XI in FIG. 3.
Figure 12:
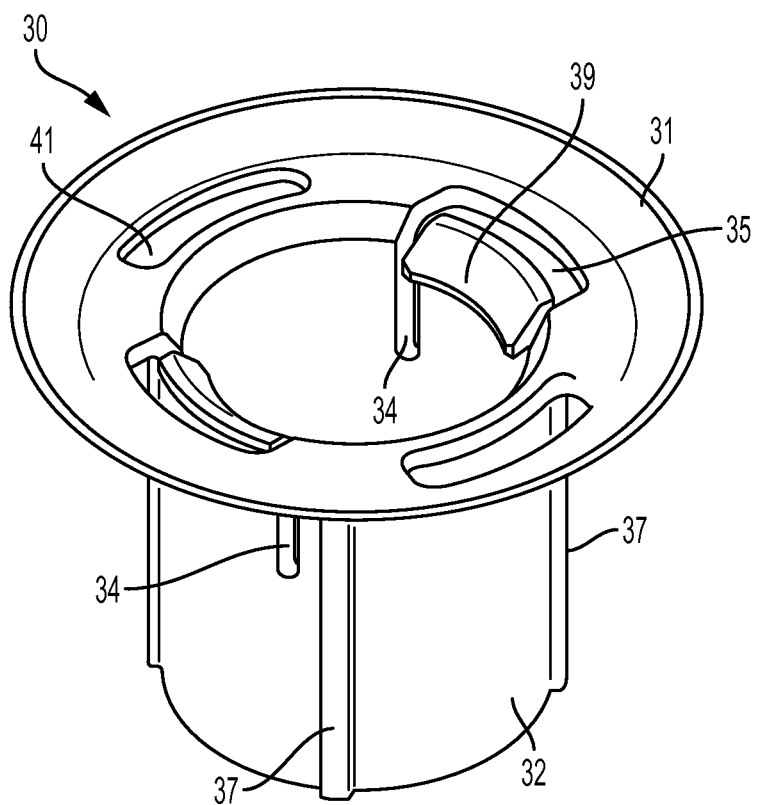
FIG. 12 is a perspective view of a second clip of the stud locking device according to the first embodiment of the present invention.

FIG. 11 which is an enlarged view of the area XI in FIG. 3 illustrates one of the lower locking pawls 13b. Each of the upper locking pawls 13a has the same shape. Each of the lower locking pawls 13b has an upper-end pawl tip 61b, an intermediate pawl tip 62b, and a lower-end pawl tip 63b. A section between the upper-end pawl tip 61b and the intermediate pawl tip 62b is formed as an upper valley 64b. A section between the intermediate pawl tip 62b and the lower-end pawl tip 63b is formed as a lower valley 65b having a flat area longer than the upper valley 64b. Each of the upper locking pawls 13a has three pawl tips and two valleys in the same manner.

Each of the upper-end pawl tip 61b and the lower-end pawl tip 63b can enter a thread groove of each of the stud bolt M6 and the stud bolt T6. The intermediate pawl tip 62b can enter a thread groove of the stud bolt M6, and it can enter a space between adjacent thread ridges of the stud bolt T6. As above, each of the locking pawls 13a, 13b in this embodiment is engageable with the stud bolt M6 and the stud bolt T6.

Figure 9:
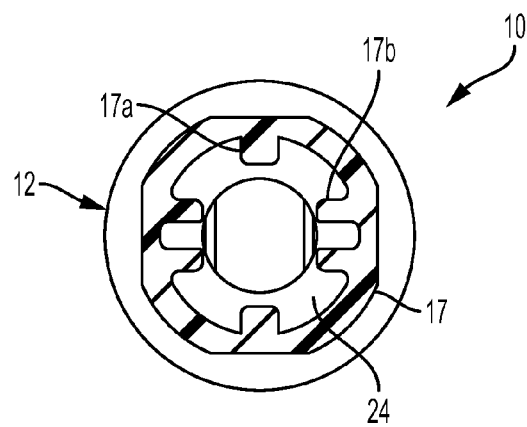
FIG. 9 is a sectional view of the first clip in FIG. 2, taken along the line IX-IX in FIG. 4.

Returning to FIG. 3, the neck portion 17 is provided between the inner cylindrical portion 12 and the flange 11 and formed to have a diameter smaller than that of the inner cylindrical portion 12. As illustrated in FIG. 9 which is a sectional view taken along the line IX-IX in FIG. 4, the neck portion 17 has an inner surface formed with two pairs of second protrusions 17b at radially opposed positions located axially just above the ribs 21, and a pair of first protrusions 17a at radially opposed positions located axially just above the locking pawls 13. The opposed first protrusions 17a and the opposed second protrusions 17b function to position the stud 70 within the stud-receiving space 24.

An edge of the top section 12b of the inner cylindrical portion 12 adjacent to the neck portion 17 forms the locking shoulder 18 serving as a first clip-side coupling means to couple the first clip 10 to the second clip 30. As illustrated in FIGS. 3 and 4, the locking shoulder 18 is formed over approximately the entire circumference of an outer periphery of the top section. When the inner cylindrical portion 12 is inserted into the outer cylindrical portion 32 of the second clip 30, the locking section 39 of the outer cylindrical portion 32 is engaged with the locking shoulder 18, so that the second clip 30 and the first clip 10 are coupled to each other.

As illustrated in FIG. 5 which is a sectional view taken along the line V-V in FIG. 2, a taper portion 14 tapered downwardly from an upper surface 11b of the flange 11 to the neck portion 17 is formed along the central axis. The taper portion 14 is continuous with the top section 12b of the inner cylindrical portion 12 in a region defining a stud through-hole 15. The stud through-hole 15 has an inner diameter slightly greater than the outer diameter of the stud 70. That is, it regulates the stud 70 to be positioned coaxial with the first clip 10, but it does not come into engagement with the stud thread. No hexagonal wrench hole 8 is formed in the upper surface 11b of the flange 11.

The taper portion 14 is formed, so that a tip of the stud 70 can be viewed with the naked eye by looking down into the taper portion 14 from the upper surface 11b of the flange 11. In a situation where the first clip 10 is not sufficiently engaged with the stud 70, it is impossible to sufficiently view the tip of the stud 70, so that it becomes possible to immediately ascertain the insufficient engagement.

Figure 7:
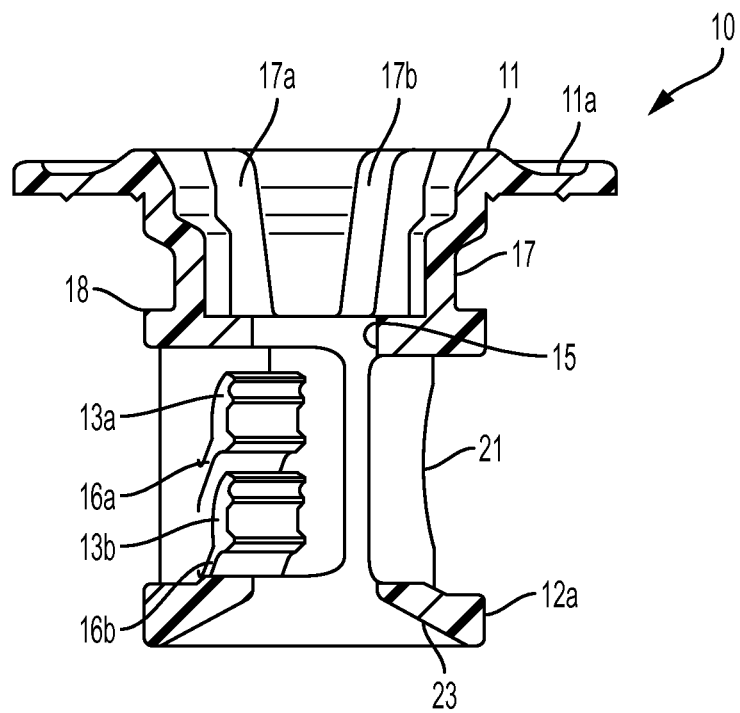
FIG. 7 is a sectional view of the first clip in FIG. 2, taken along the line VII-VII in FIG. 2.

As illustrated in FIGS. 5, 6 and 7, each of the protrusions 17a, 17b is formed to extend from the upper surface 11b of the flange 11 to the stud through-hole 15. A tool such as a flat-blade screwdriver can be inserted into the taper portion 14 in such a manner that a distal end of the tool is engaged with the protrusions 17b or the protrusions 17a, and rotationally driven to rotate the entire first clip 10 including the inner cylindrical portion 12 around the central axis of the stud 70. The tool can be used to rotate the entire first clip 10 including the inner cylindrical portion 12 around the central axis of the stud 70 to allow the locking pawls 13 to be further strongly engaged with the stud 70. The tool can also be used to reversely rotate the first clip 10 to release the tightened state. Further, the tool can be used to rotate the first clip 10 to allow a raised portion on the target member to be received in a groove in a lower surface of the flange 11, as mentioned below.

Figure 22:
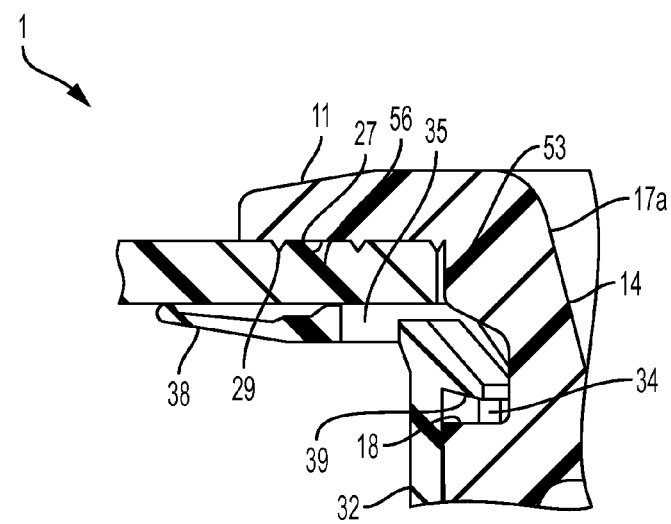
FIG. 22 is an enlarged view of the area XXII in FIG. 21.

FIG. 21 is a sectional view illustrating a state in which the target member 51 is mounted to the support member 52 with the stud 7 by using the stud locking device 1. FIG. 22 is an enlarged view of the area XXII in FIG. 21.

The lower surface of the flange 11 has a plurality of linear grooves 27 arranged in parallel side-by-side relation. Each of the grooves 27 is configured to receive therein a respective one of a plurality of raised portions 56 formed on an upper surface of the target member 51. Two protrusions 29 are formed on both sides of each of the grooves 27. The raised portions 56 of the target member are engageable, respectively, with the grooves 27 to thereby prevent the first clip 10 from rotating about the central axis of the inner cylindrical portion 12. When the first clip 10 is pushed into and coupled to the second clip 30 and then the first clip 10 is rotated by a small angle, each of the raised portions 56 is received in any one of the grooves 27, so that it becomes possible to keep the stud locking device 1 from being loosened during use. Although the raised portions 56 of the target member 56 are engaged with the respective grooves 27, the first clip 10 can be rotated when an operator detaches the target member, and the first clip 10 can be detached from the stud 70 by rotating the first clip 10 about the central axis of the stud 70 to disengage the locking pawls 13 from the thread ridges of the stud 70.

As illustrated in FIG. 5, the base section 12a of the inner cylindrical portion 12 is formed with a guide wall tapered upwardly. The guide wall 23 is continuous with the stud-receiving space 24.

The guide wall 23 of the first clip 10 can guide the tip of the stud 70 to the stud-receiving space 24 to allow the locking pawls 13 of the first clip 10 to be engaged with the thread ridges of the stud 70. If a taper angle Δ of the guide wall 23 is excessively large, it is necessary to largely set a distance between the base section 12a and the arm 16 of the first clip 10, resulting in increase in size of the first clip 10. If the taper angle Δ of the guide wall 23 is excessively small, the tip of the stud is less likely to enter into an inlet of the guide wall 23. As used in this specification, the term "taper angle of the guide wall (23)" means an angle Δ defined between opposed surfaces of the guide wall (23) symmetrically with respect to the central axis in FIG. 5. Preferably, the taper angle Δ of the guide wall 23 is set in the range of 115 to 135°. In the first embodiment, the taper angle Δ of the guide wall 23 is set to 124°.

With reference to FIGS. 12 to 20, the second clip 30 will be described. FIG. 12, FIG. 13, FIG. 14, FIG. 15 and FIG. 16 are, respectively, a perspective view, a top plan view, a front view, a bottom view and a right side view of the second clip 30.

The second clip 30 has the hollow outer cylindrical portion 32, and the flange 31 formed at one end of the outer cylindrical portion 32. The outer cylindrical portion 32 is configured to receive therein the inner cylindrical portion 12 of the first clip 10. The flange 31 has an upper surface configured to come into contact with the other surface (lower surface) of the target member 51. The flange 31 has an outer edge portion formed as an elastic edge portion 38 extending obliquely upwardly and outwardly. The elastic edge portion 38 is capable of elastically pressing the lower surface of the target member 51 toward the flange 11 of the first clip 10. Preferably, the elastic edge portion 38 of the flange 31 is protrudingly formed in the edge portion of the flange 31 in such a manner as to come into press contact with the target member 51.

Figure 13:
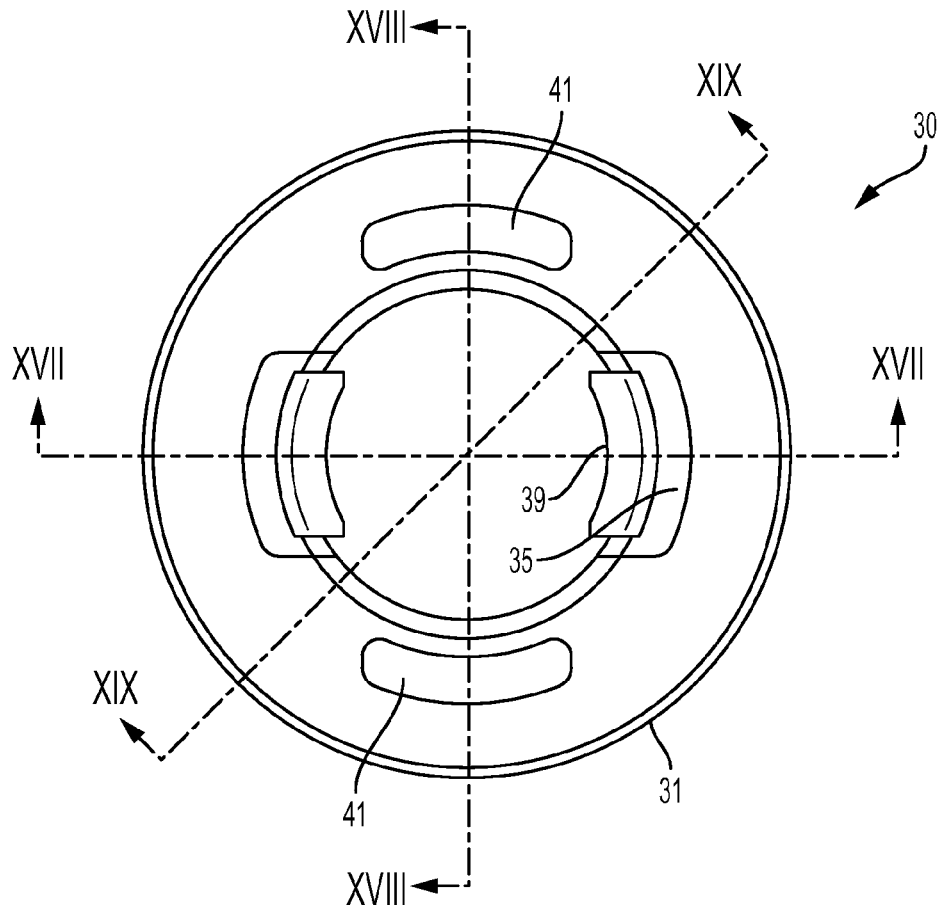
FIG. 13 is a top plan view of the second clip in FIG. 12.
Figure 18:
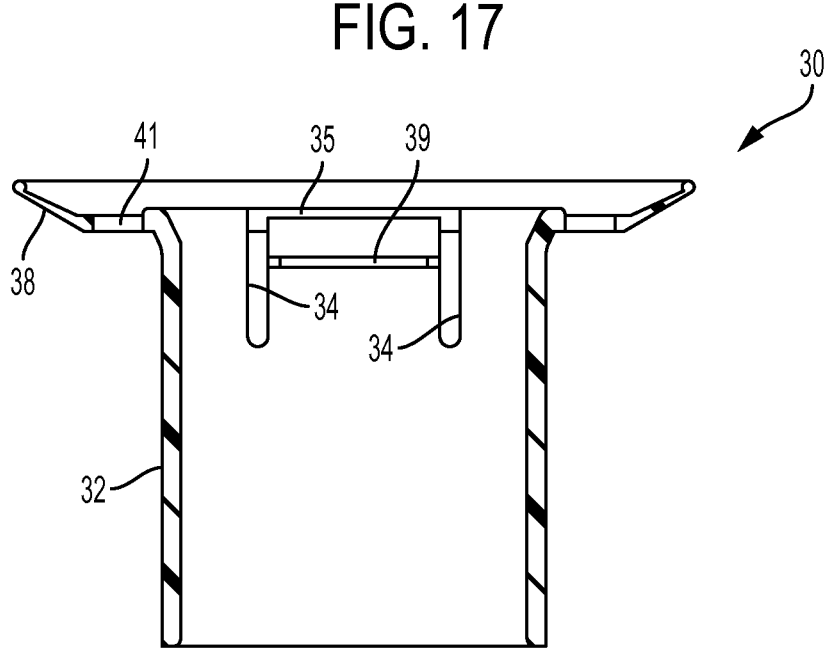
FIG. 18 is a sectional view of the second clip in FIG. 12, taken along the line XVIII-XVIII in FIG. 13.

As illustrated in FIG. 13 and FIG. 18 which is a sectional view taken along the line XVIII-XVIII in FIG. 13, the flange 31 is formed with two flange holes 41 opposed to each other symmetrically with respect to the central axis of the second clip 30 and each elongated in a circumferential direction thereof. The flange holes 41 help elastic bending of the elastic edge portion 38.

The outer cylindrical portion 32 is formed as a hollow circular tube having an inner diameter greater than the outer diameter of the inner cylindrical portion 12 of the first clip 10 so as to receive therein the inner cylindrical portion 12.

Figure 16:
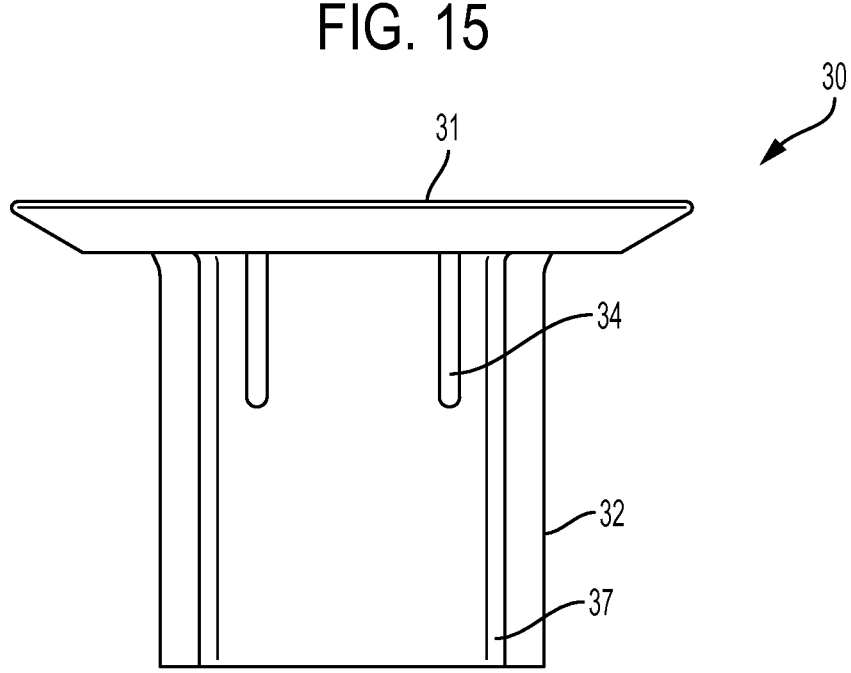
FIG. 16 is a right side view of the second clip in FIG. 12.
Figure 17:
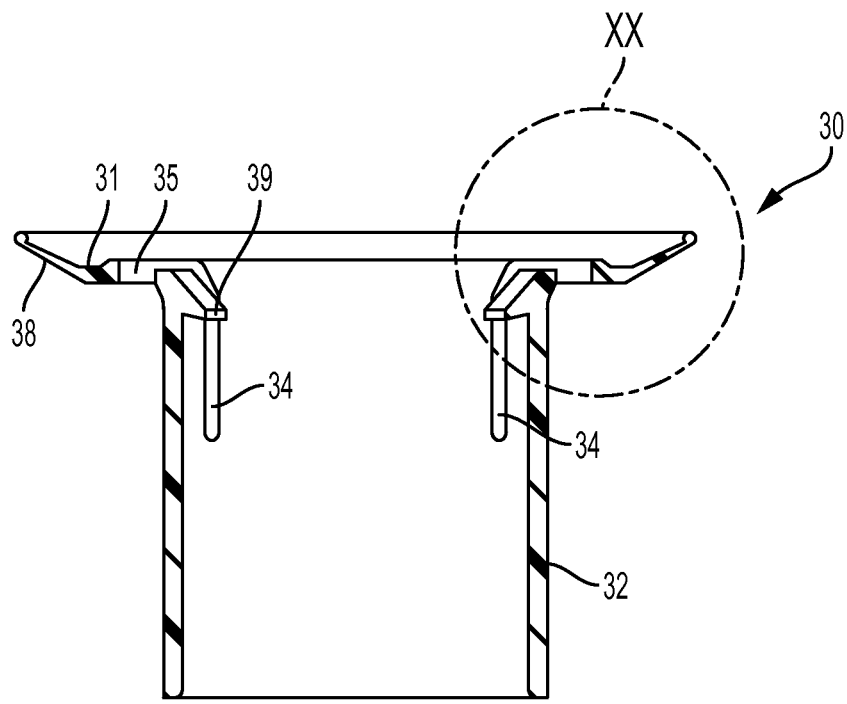
FIG. 17 is a sectional view of the second clip in FIG. 12, taken along the line XVII-XVII in FIG. 13.

The outer cylindrical portion 32 has the locking section 39. The locking section 39 functions as a second clip-side coupling means to couple the second clip 30 to the first clip 10. The locking section 39 is separated from the outer cylindrical portion 32 by a pair of lateral slits 34 extending in an axial direction of the outer cylindrical portion 32, as illustrated in FIG. 16. The locking section 39 is further separated from a main body of the outer cylindrical portion 32 by an upper slit 35, as illustrated in FIG. 17 which is a sectional view taken along the line XVII-XVII in FIG. 13, and FIG. 20 which is an enlarged view of the area XX in FIG. 17.

Figure 20:
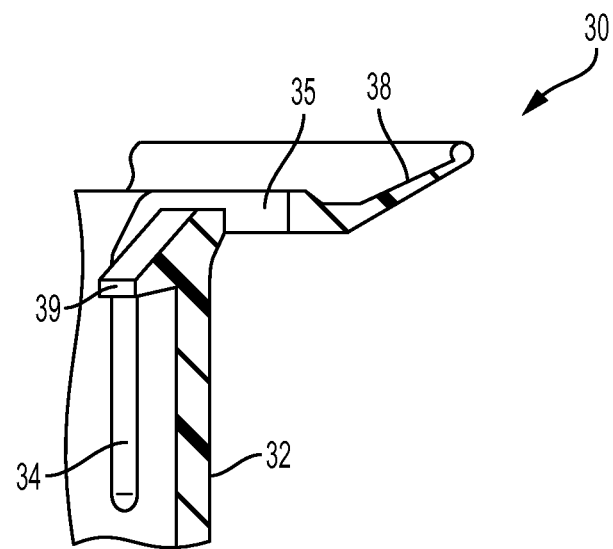
FIG. 20 is an enlarged view of the area XX of the second clip in FIG. 17.

This facilitates elastic bending of the locking section 39. As illustrated in FIG. 20, an engagement surface of the locking section 39 with the locking shoulder is formed at a certain angle (in this embodiment, 14°) with respect to the locking shoulder so as to prevent the first clip from being easily uncoupled therefrom.

When the inner cylindrical portion 12 of the first clip 10 is inserted into the outer cylindrical portion 32, and the locking section 39 reaches an outer periphery of the neck portion 17, the locking section 39 easily comes into elastic engagement with the locking shoulder 18 which is the coupling means of the first clip 10. In order to reliably maintain the coupling to the first clip 10, the locking section 39 is provided in a plural number (in the illustrated embodiment, two).

Figure 19:
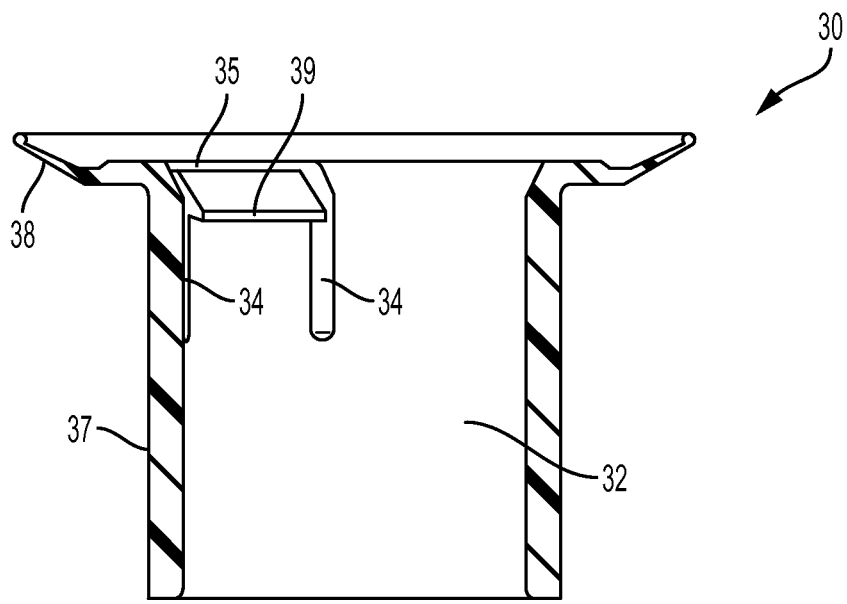
FIG. 19 is a sectional view of the second clip in FIG. 12, taken along the line XIX-XIX in FIG. 13.

As illustrated in FIG. 19 which is a sectional view taken along the line XIX-XIX in FIG. 13, the flange 31 and the outer cylindrical portion 32 are continuous with each other in the axial direction of the second clip 30, in a region where there is not the flange holes 41 and the upper slit 35.

Figure 14:
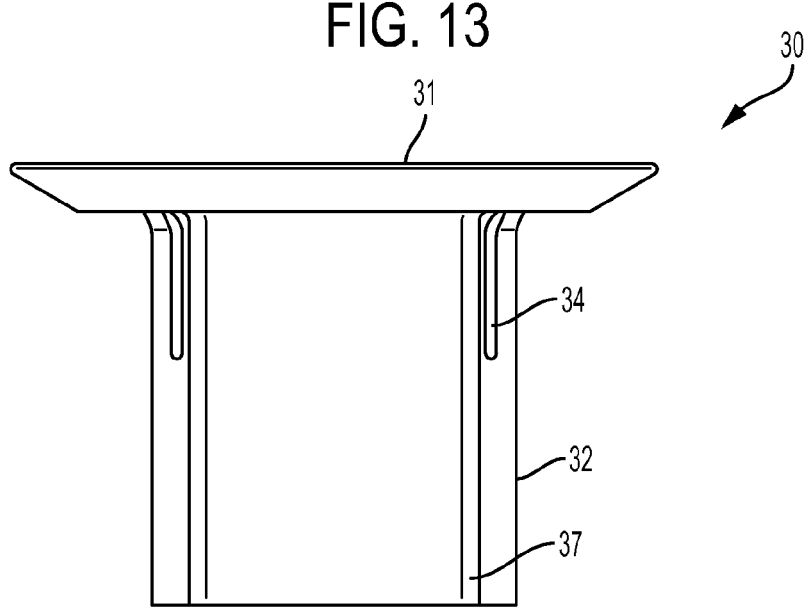
FIG. 14 is a front view of the second clip in FIG. 12.
Figure 15:
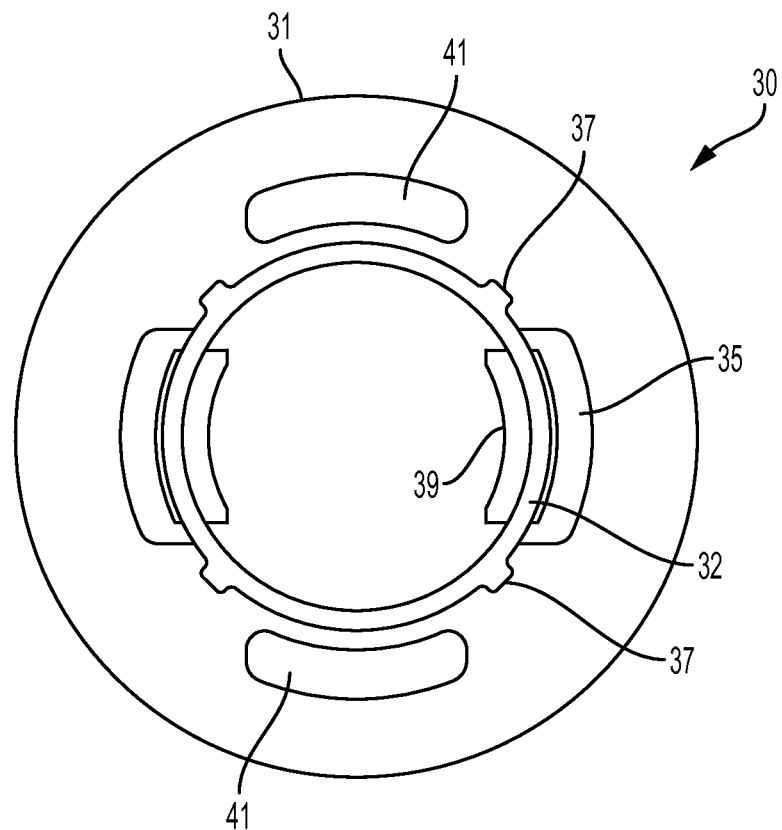
FIG. 15 is a bottom view of the second clip in FIG. 12.

As illustrated in FIGS. 14 and 15, a plurality of (in the illustrated embodiment, four) ribs 37 are formed on an outer surface of the outer cylindrical portion 32 to extend in the axial direction so as to increase strength of the outer cylindrical portion 32. FIG. 19 illustrates a cross-section along the rib 37.

Refer to FIG. 21 illustrating the state in which the target member 52 is mounted to the support member 52 with the stud 70 by using the stud locking device 1, again. The stud locking device 1 comprises the second clip 30 and the first clip 10. In the stud locking device 1, the second clip 30 and the first clip 10 are coupled to each other while interposing the target member 51 therebetween, i.e., clamping the target member 51 by a certain clamping force. Based on the clamping force, the flange 31 of the second clip 30 and the flange 11 of the first clip 10 can clamp the target member without wobbling in the axial direction of the stud 70. Based on the clamping force, the raised portions 56 of the target member 51 are pressed in such a manner as to be kept from being disengaged from the respective grooves 27 in the lower surface of the flange 11 of the first clip 10. The elastic edge portion 38 of the flange 31 prevents wobbling of the target member 51 and prevents a relative movement between the first clip 10 and the second clip 30 about the central axis. This prevents the target member 51 from being demounted from the support member 52. In the case where the target member 51 expands or contracts according to changes in temperature, the target member 51 can move in an in-plain direction.

With reference to FIG. 21, an operation of attaching the stud locking device 1 comprising the first and second clips 10, 30 configured as above, to the target member 51 in a clamping manner, and then mounting the target member attached to the stud locking device 1, to the support member 52 having the stud 70 fixed thereto will be described.

In the step of attaching the stud locking device 1 to the target member 51, the inner cylindrical portion 12 of the first clip 10 is positioned so as to be insertable into the mounting hole 53 of the target member 51, and the outer cylindrical portion 32 of the second clip 30 is positioned so as to receive therein the inner cylindrical portion 12 being inserted into the mounting hole 53. The first clip 10 is pushed to allow the inner cylindrical portion 12 to be inserted into the mounting hole 53. Then, the second clip 30 is pushed to allow the outer cylindrical portion 32 to receive therein the inner cylindrical portion 12 of the first clip 10.

As a result of the above operations, the target member 51 is sandwiched between the flange 11 of the first clip 10 and the flange 31 of the second clip 30. Further, when the first clip 10 and the second clip 30 are pushed to each other, the locking section 39 of the second clip 30 is locked to the locking shoulder 18 of the neck portion 17 on the inner cylindrical portion 12 of the first clip 10. When the locking shoulder 18 of the first clip 10 and the locking section 39 of the second clip 30 are locked together, the first clip 10 and the second clip 30 are coupled to each other, and the target member 51 is clamped between the flange 11 of the first clip 10 and the flange 31 of the second clip 30. In this state, the elastic edge portion 38 as the outer edge portion of the flange 31 of the second clip 30 comes into press contact with the target member 51 to allow the target member 51 to be clamped by a given clamping force.

FIG. 22 is an enlarged view of the area XXII in FIG. 21. When the target member 51 is clamped between the flange 11 of the first clip 10 and the flange 31 of the second clip 30, the raised portions 56 formed on the target member 51 are received in the respective grooves 27 in the lower surface of the flange 11 of the first clip 10. Preferably, a cross-sectional shape of each of the grooves 27 is formed in conformity to a shape of a respective one of the raised portions 56.

As above, the raised portions 56 are received in the respective grooves 27. This prevents a relative movement between the first clip 10 and the second clip 30 about the central axis to thereby keep the stud locking device 1 from being un-tightened during use.

The protrusions 29 are formed at opposite edges of each of the grooves 27. When an operator detaches the target member 51, a tool such as a flat-blade screwdriver can be inserted into the taper portion 14 of the first clip 10, and rotationally driven to rotate the first clip 10 around the central axis of the stud 70 to thereby disengage the locking pawls 13 from the stud 70. In the case where a plurality of the mounting holes 53 are formed in the target member 51 at respective positions, a plurality of the stud locking devices 1 each comprising the first clip 10 and the second clip 30 are attached to a respective one of the mounting holes 53.

For example, in the case where the support member 52 is a panel of an automotive vehicle, the target member 51 with the stud locking devices 1 attached thereto in the above manner is carried in an automotive vehicle assembling line or the like.

An assembling operator locates the target member 51 with the stud locking devices 1 attached thereto, at a given position with respect to the support member 52 such as a panel of an automotive vehicle. Specifically, the target member 51 is positioned in such a manner that the plurality of studs 70 fixedly attached onto the support member 52 are received, respectively, into hollow spaces of the inner cylindrical portions 12 of the first clips 10 of the plurality of stud locking devices 1. The stud locking devices 1 are preliminarily attached to the target member 51, so that the operator can give his/her full attention to the operation of positioning the stud locking devices 1 attached to the target member 51, with respect to the studs 70, because the operator is free of an operation of carrying the stud locking devices 1. During the positioning, the tip of each of the studs 70 can be readily guided to the stud-receiving space 24 of a respective one of the first clips 10 by using the guide wall 23 of the first clip 10.

After completion of the positioning operation, the target member 51 is pressed against the support member 52 in such a manner as to allow the stud 70 to be received in the stud-receiving space 24 inside the inner cylindrical portion 12 of the first clip 10. As a result of this operation, the stud 70 is inserted into the stud-receiving space 24, and the locking pawls 13 formed inside the inner cylindrical portion 12 are bent outwardly to allow the stud 70 to be sufficiently received in the stud-receiving space 24. When further pressed, the locking pawls 13 slides on the thread formed on the peripheral surface of the stud 70. When a lower surface of the outer cylindrical portion 32 of the second clip 30 comes into contact with the support member 52, the locking pawls 13 stops sliding and comes into engagement with thread ridges of the stud 70, so that the target member 51 is locked to the support member 52.

After the target member 51 is mounted to the support member 52, the flat-blade screwdriver may further be inserted into the taper portion 14 of the flange 11 of the first clip 10, and rotationally driven to rotate the first clip 10 around the central axis of the stud 70 to allow the locking pawls 13 of the first clip 10 to be further tightly engaged with the stud 70. Alternatively, the flat-blade screwdriver may be inserted into the taper portion 14 of the first clip 10, and rotationally driven to reversely rotate the first clip 10 to release the tightened state and demount the target member from the support member 52.

Figure 23:
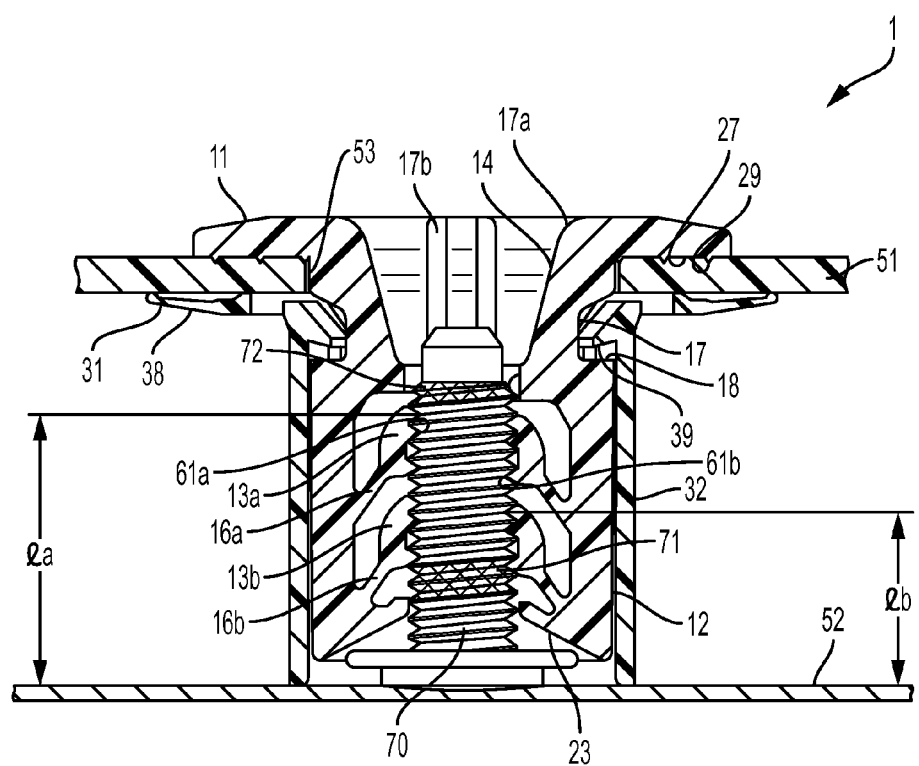
FIG. 23 is a sectional view illustrating a state in which the stud locking device in FIG. 21 is mounted to a stud having an incompletely threaded portion.

FIG. 23 is a sectional view illustrating a state in which the stud locking device in FIG. 21 is mounted to a stud having an incompletely threaded portion. A stud 70 is formed with an incompletely threaded portion 71 in a region adjacent to a base end thereof. The incompletely threaded portion 71 has a shape after slightly crushing a thread ridge. In an operation of mounting the target member 51 to the stud 70, there is a case where the target member 51 is mounted to the stud 70 by using a nut, instead of the stud locking device. In this case, the incompletely threaded portion 71 is provided so as to prevent loosening of a nut.

Further, there is another incompletely threaded portion 72 in a region adjacent to a tip of the stud 70. The incompletely threaded portion 72 occurs during formation of thread ridges of the stud 70.

In use of the stud locking device 1 according to this embodiment, if each of the locking pawls 13a, 13b is engaged with the incompletely threaded portion 71 (72), a contact between the incompletely threaded portion 71 (72) and each of the locking pawls 13a, 13b becomes unstable.

In this embodiment, the locking pawl 13 engageable with the stud 70 is provided in two-stage manner in an up-down direction. The incompletely threaded portion 71 is located in a region adjacent to the base end of the stud 70, and the incompletely threaded portion 72 is located in a region adjacent to the tip of the stud 70. Heretofore, a pair of upper and lower locking pawls 13a, 13b have been largely offset in the up-down direction. Thus, a part of a plurality of pawl tips of the upper locking pawl 13a comes into contact with a thread ridge of the incompletely threaded portion 72, and a part of a plurality of pawl tips of the lower locking pawl 13b comes into contact with a thread ridge of the incompletely threaded portion 71.

If the up-down directional offset between the pair of upper and lower locking pawls 13a, 13b is reduced, the pawl tips of the upper locking pawl 13a become less likely to come into contact with the thread ridge of the incompletely threaded portion 72, and the pawl tips of the lower locking pawl 13b become less likely to come into contact with the thread ridge of the incompletely threaded portion 71.

In one example of the first clip 10 in this embodiment, a height lb from an upper surface of the support member to the upper-end pawl tip 61b of a lower one (right one) of the pair of lower locking pawls 13b is 9.6 mm (conventionally, 8.6 mm). Thus, each of the lower locking pawls 13b becomes less likely to come into contact with the thread ridge of the incompletely threaded portion 71 on the side of the base end.

On the other hand, a height la from the upper surface of the support member 52 to the upper-end pawl tip 61a of a higher one (left one) of the pair of upper locking pawls 13a is 15.1 mm (conventionally, 16.1 mm). Thus, each of the upper locking pawls 13a becomes less likely to come into contact with the thread ridge of the incompletely threaded portion 72 on the side of the tip.

A distance from the upper-end pawl tip 61b of the lower one of the pair of lower locking pawls 13b to the upper-end pawl tip 61a of the higher one of the pair of upper locking pawls 13a is 5.5 mm (conventionally, 7.5 mm), so that each of the pawl tips 61, 62, 63 becomes less likely to come into contact with the incompletely threaded portion 71 (72).

In the above embodiment, the target member 51 can be mounted to the support member 52 readily and reliably by clamping the target member 51 between the flange 11 of the first clip 10 and the flange 31 of the second clip 30, and inserting the stud 70 into the stud-receiving space 24 inside the inner cylindrical portion 12 of the first clip 10 to allow the locking pawls 13 to be engaged with the thread ridges of the stud 70.

In addition, a head of the stud 70 can be viewed through the taper portion 14, so that it becomes possible to readily ascertain whether the first clip 10 is perfectly mounted to the stud 10.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A stud locking device, operable when in an assembled condition for securing a target member to a support member, the target member including an upper surface and a lower surface and partially defining a through mounting hole, and the support member including a stud projecting axially toward the lower surface of the target member and the stud including an engageable surface; the stud locking device comprising:
   a first clip including:
      a hollow inner cylindrical portion defining a central axis and partially defining a central bore operable for receiving the stud, the first cylindrical portion insertable at a base end into the mounting hole of the target member;
      an annular first flange located at a target end of the first cylindrical portion and projecting radially outward from the first cylindrical portion;
      a guide wall located in the base end of the inner cylindrical portion and tapering radially inward toward the flange of the inner cylindrical portion, and operable to guide the stud into the central bore as the stud locking device is placed into the assembled condition;
      a tapered bore partially defined by and coaxial with the flange and first cylindrical portion, the tapered bore open at a first end in an upper surface of the flange, narrowing with increasing axial distance from the first end, and connected to the central bore at a second end;
      a locking pawl projecting radially inward into the central bore from the first cylindrical portion and operable to engage the stud when the stud locking device is in the assembled condition;
      a locking shoulder; and
   a second clip including:
      a hollow outer cylindrical portion capable of receiving coaxially therein the first cylindrical portion of the first clip;
      a second flange provided at a target end of the outer cylindrical portion; and
      a locking tab engageable with the locking shoulder when the stud locking device is in the assembled condition.

2. The stud locking device as defined in claim 1, and when in the assembled condition the inner cylindrical portion of the first clip is inserted through the mounting hole of the target member, the first flange of the first clip contacts the upper surface of the target member, and, when the inner cylindrical portion of the first clip is received in the outer cylindrical portion of the second clip, the second flange of the second clip contacts the lower surface of the target member.

3. The stud locking device as defined in claim 1, wherein the taper angle $\Delta$ of the guide wall is in the range of 115 to 135°.

4. The stud locking device as defined in claim 1, wherein the second flange includes an elastic edge portion extending obliquely radially and axially, and in the assembled condition the elastic edge portion is operable of elastically pressing the target member toward the first flange of the first clip.

5. The stud locking device as defined in claim 4, wherein the second flange of the second clip includes a flange hole, the flange hole radially located outward of the outer cylinder and elongated in the circumferential direction, which makes the elastic edge portion adjacent to and radially outward of the flange hole more flexible.

6. The stud locking device as defined in claim 1, wherein the locking pawl is an upper pair of locking pawls and the inner cylindrical portion further includes a lower pair of locking pawls axial separated from the upper pair in the direction away from the target end; and the inner cylindrical portion further includes a first rib and second rib extending along the axial direction and projecting into the central bore from radially opposite directions.

* * * * *